United States Patent [19]

Bohannon, Jr. et al.

[11] Patent Number: 4,557,560

[45] Date of Patent: Dec. 10, 1985

[54] RODENT AND LIGHTNING PROTECTIVE SHEATH SYSTEM FOR CABLES

[75] Inventors: William D. Bohannon, Jr., Lawrenceville; Roy P. Collins, Norcross; Michael D. Kinard, Lawrenceville; William C. L. Weinraub, Duluth, all of Ga.

[73] Assignees: AT&T Technologies, Inc., Berkeley Heights; AT&T Bell Laboratories, Murray Hill, both of N.J.

[21] Appl. No.: 551,797

[22] Filed: Nov. 15, 1983

[51] Int. Cl.$^4$ .............................................. G02B 5/16
[52] U.S. Cl. ............................. 350/96.23; 174/106 D
[58] Field of Search ................. 350/96.23; 174/106 D, 174/107

[56] References Cited

U.S. PATENT DOCUMENTS

| | | | |
|---|---|---|---|
| 4,122,248 | 10/1978 | Pfleger et al. | 528/481 |
| 4,241,979 | 12/1980 | Gagen et al. | 350/96.23 |
| 4,309,072 | 1/1982 | Tweeddale | 350/96.23 |
| 4,328,394 | 5/1982 | Aloisio, Jr. et al. | 174/106 D |
| 4,361,381 | 11/1982 | Williams | 350/96.23 |
| 4,505,541 | 3/1985 | Considine et al. | 350/96.23 |

*Primary Examiner*—John Lee
*Attorney, Agent, or Firm*—E. W. Somers

[57] ABSTRACT

A sheath system (50) for a lightguide fiber cable (20) includes a corrugated inner shield (51) which is made of a metallic material having suitable electrical and thermal conductivity to dissipate lightning energy and a corrugated outer shield (60). The outer shield which has an overlapped longitudinal seam is a laminate comprising a corrosion-resistant metallic material (64) which has a relatively high elongation, at least a predetermined chromium content, and a relatively coarse outer surface, and an adhesive system (62). Included in the adhesive system is a first adhesive material (66) which bonds to the outer surface of the metallic material and a second adhesive material (68) which causes the outer shield to become bonded to a plastic jacket (70) which is extruded thereover. The bond between the jacket and the outer shield has sufficient peel strength to prevent the jacket from being separated readily from the outer shield. This causes the jacket and outer shield to function as a composite structure which inhibits the degradation of the sheath system by rodents and withstands the mechanical impact of a direct lightning strike.

24 Claims, 7 Drawing Figures

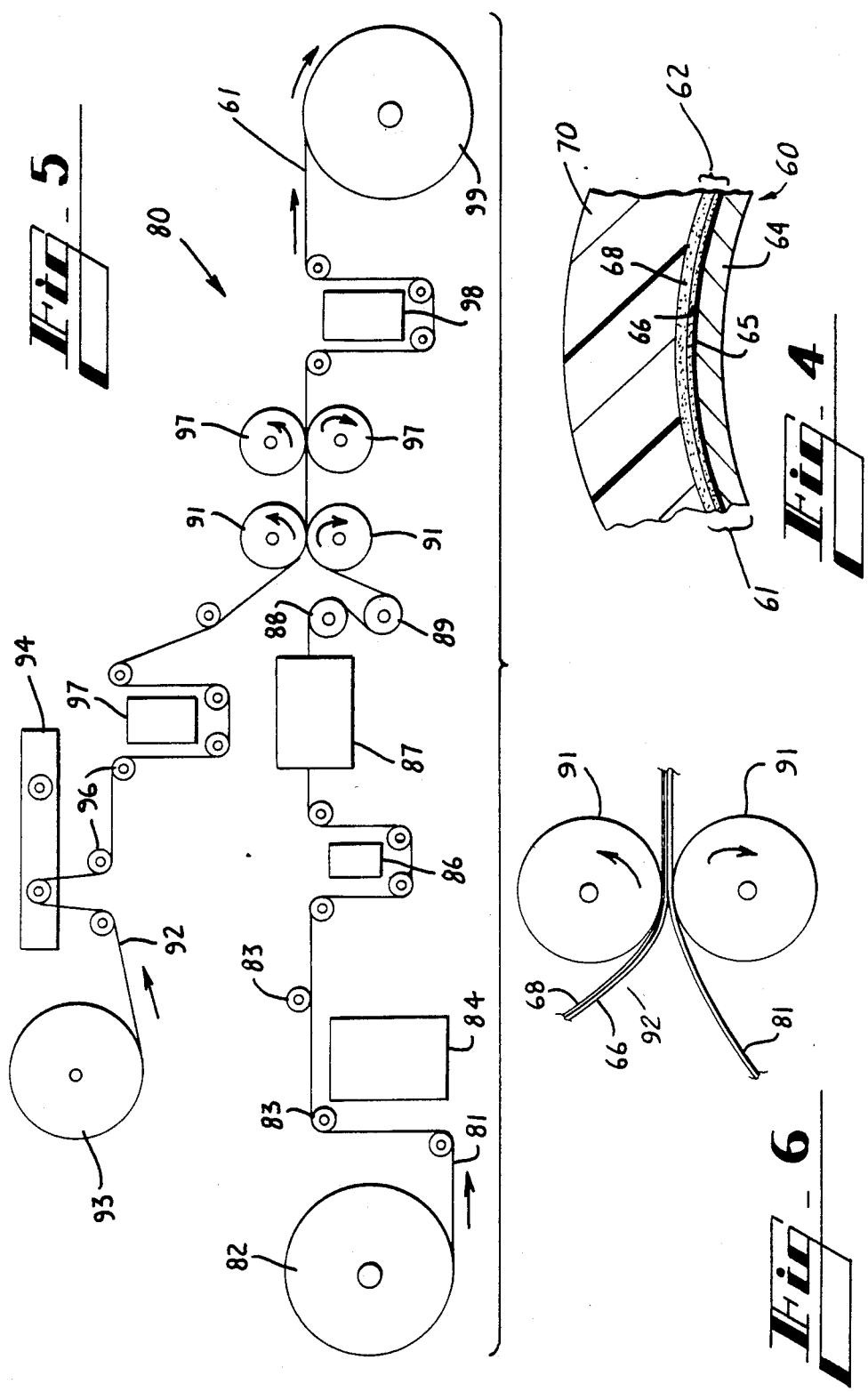

RODENT AND LIGHTNING PROTECTIVE SHEATH SYSTEM FOR CABLES

TECHNICAL FIELD

This invention relates to a rodent and lightning protective sheath system for a cable and, more particularly, it relates to a sheath system which is effective to provide protection for relatively small, lightguide fiber cables against rodents and lightning.

BACKGROUND OF THE INVENTION

Communications cables which are strung between poles or those which are buried in the ground are subjected to abuse such as, for example, attack by rodents, mechanical abrasion and crushing. Attacks by gophers on buried cable and by squirrels on aerial cable have been a continuing concern. Gophers, for example, have been shown to exert biting pressures as high as 18,000 psi. Cables having an outside diameter below a critical size of about 0.75 inch in diameter are more apt to be damaged than larger cables because the animals can bite directly down on them. For larger size cables, only a scraping or raking action takes place. In fact, on cables exceeding about 2 inches in diameter, gopher attack is rarely observed.

It has been found that with limited exceptions, the only way to protect directly exposed cables from rodent attack is to wrap them in a metallic shield. A longitudinally applied shield, if otherwise suitable, would be economically preferable from a manufacturing standpoint. For cables above the critical size, the use of a corrugated shield having a longitudinally overlapped seam generally has provided sufficient protection. However, in the smaller sizes, such a shield arrangement had led to failures. Rodents have been able to encompass the cable with their teeth and pull open the seam.

Both buried and aerial cables also are damaged by lightning strikes. Thermal damage, that is burning, charring and melting of the sheath components, is caused by the heating effects of the lightning arc and a current being carried to ground by the metallic members of the core or sheath. In buried cables, a second mode of damage is mechanical, causing crushing and distortion of the sheath. This results from an explosive impact, sometimes called a steamhammer effect, which is caused by the instantaneous vaporization of water in the earth in a lightning channel to the cable.

The prior art abounds with patents relating to metallic sheath systems for copper core cables such as one comprising an aluminum shield enclosed by a carbon steel shield with each having a longitudinal seam. This sheath system offers protection from mechanical damage, electromagnetic interference and lightning and its cost is quite low because it is made in a single pass at relatively high line speeds. However, the use of a shield which is made of carbon steel occasionally has resulted in long term failures, even in cables larger than 0.75 inch. Failure may occur because the underlying steel shield may become exposed when rodents violate the jacket. Once exposed, the steel shield, which withstands the initial attack by rodents, corrodes readily. This renders it ineffective for general mechanical protection and for protection from any subsequent rodent attack. In this regard, it should be pointed out that gophers are territorial animals which repeatedly return to areas previously occupied by them. Therefore, it is not uncommon to experience secondary attacks in the same location along a cable. These cables may fail also because of the presence of a longitudinal seam formed in a shield which is made of a steel having mechanical properties which are not sufficient to cause the shield to be protected from rodent abuse.

The prior art also includes a cable which is enclosed in a copper inner shield and a relatively thin steel outer shield which is bonded to an outer plastic jacket. Because of the relatively thin outer shield, the plastic jacket can be removed easily to facilitate grounding without damaging the inner shield. Ease of jacket removal, however, is not a characteristic which is desired for a cable that is exposed to rodents.

Lately, lightguide fiber cables have made inroads into the communications cable market. They too are subject to rodent attack. Inasmuch as lightguide fiber cables fall into a range of about 0.5 to 0.8 inch in diameter, the use of longitudinal overlapped seams has been in question. A prior art lightguide cable sheath system which offers rodent protection comprises two helically wrapped, non-corrugated stainless steel shielding tapes enclosed in a plastic jacket. However, it has several shortcomings. It is very expensive to manufacture because of low line speeds and the complex machinery required to wrap the tapes helically about a core, and because the taping and jacketing have to be accomplished in two separate operations. Although metallic conductors are not used for transmission in lightguide fiber cables, metallic members are commonly used in the sheath system, for example. The protection offered against lightning strikes is affected adversely because of the relatively low conductivity of stainless steel and the relatively low impact resistance of helically applied, flat tapes. Rodent and lightning protection are perhaps even more critical for a lightguide fiber cable due to its relatively high capacity and the fragility of the glass fibers. Also, lightguide cable is exposed to typical mechanical hazards such as abrasion and crushing, for example, during installation.

Seemingly, the prior art is devoid of an economical sheath system which provides protection against rodents and lightning, as well as against mechanical hazards, particularly for small size cables such as might be used in lightguide communications. What is desired is a cable structure which resists degradation by requiring rodents to remove laboriously each elemental piece of jacket material from a tough, durable metallic shield.

SUMMARY OF THE INVENTION

The foregoing problems have been solved by a cable sheath system of this invention. The sheath system which encloses a core comprising at least one conductor such as a lightguide fiber, for example, includes an inner metallic shield which has a relatively high thermal capacity and a relatively low resistivity. An outer corrugated shield encloses the inner metallic shield and has a longitudinal seam. The outer shield is a laminate which comprises a first adhesive material, a corrosion-resistant metallic material having a relatively high elongation and at least a predetermined chromium content, and a second adhesive material which is bonded to the first. The corrosion-resistant metallic material includes a base layer, an oxide surface layer to which is bonded the first adhesive material and a relatively coarse outer surface. The oxide layer has sufficient cohesion and sufficient adhesion to the base layer and to the first adhesive material to prevent delamination when the laminate is corrugated and formed into the outer shield. The outer shield is bonded to a jacket which comprises a plastic material, the bonding being accomplished through the second adhesive material. The corrosion-resistant metallic material has sufficient thickness, elongation and tensile strength to cause the bonded composite comprising the jacket and the outer shield to inhibit degradation by rodents and provide the cable with enhanced lightning impact resistance. Rodents cannot lift entire portions of the jacket from the underlying shield. Instead they must chew away each elemental area of the jacket which may discourage them from further attack.

In a method of making the rodent and lightning resistant cable of this invention, a strip of stainless steel which has an elongation and a chromium content falling in predetermined ranges is preheated to a temperature in the range of about 400° F. to 550° F. The stainless steel has a surface layer which comprises a relatively thin oxide layer, and a relatively coarse surface to which is to be bonded a first adhesive material of a dual adhesive strip which is moved into juxtaposition with the stainless steel strip. The dual strip also includes a second adhesive material which is referred to as a carrier. The first adhesive material in a preferred embodiment includes a terpolymer comprising ethylene, an ethylenically unsaturated carboxylic acid and an ester of an ethylenically unsaturated carboxylic acid whereas the carrier comprises a linear low density polyethylene material. The strips of steel and dual adhesive are moved between two cooperating rollers such that the first adhesive material faces the stainless steel strip. The rollers subject the strips to a predetermined pressure and to a first temperature which is less than the melting point of the first adhesive material. Afterwards, the strips are advanced between a second set of cooperating rollers which apply approximately the same pressure to the strips, and which are maintained at a temperature that exceeds the melting point of the first adhesive but which is less than the melting point of the carrier. This causes the adhesive-carrier dual strip to become laminated to the stainless steel strip.

A corrugated strip of metallic material having a relatively high conductivity is caused to be formed into an inner shield which encloses a cable core. Subsequently, the steel-adhesive laminate is corrugated and formed into an outer shield which encloses the inner shield. The outer shield is caused to become bonded to the jacket as the jacket is extruded over it. The bonding provides a composite steel-plastic outer sheath which is substantially rodent resistant and which provides the cable with enhanced lightning impact resistance. Methods and apparatus for making the cable of this invention are disclosed and claimed in copending Application Ser. No. 551,798 now U.S. Pat. No. 4,487,641 issued on Dec. 11, 1984 filed on even date herewith in the names of W. D. Bohannon, Jr. and M. D. Kinard.

BRIEF DESCRIPTION OF THE DRAWINGS

Other features of the present invention will be more readily understood from the following detailed description of specific embodiments thereof when read in conjunction with the accompanying drawings, in which:

FIG. 4 is an enlarged view of a portion of the sheath system;

FIG. 5 is a schematic view of a manufacturing line for providing a laminate comprising a corrosion-resistant metallic material and an adhesive system;

FIG. 6 is a detail view of a portion of the line shown in FIG. 5; and

DETAILED DESCRIPTION

Figure 1:
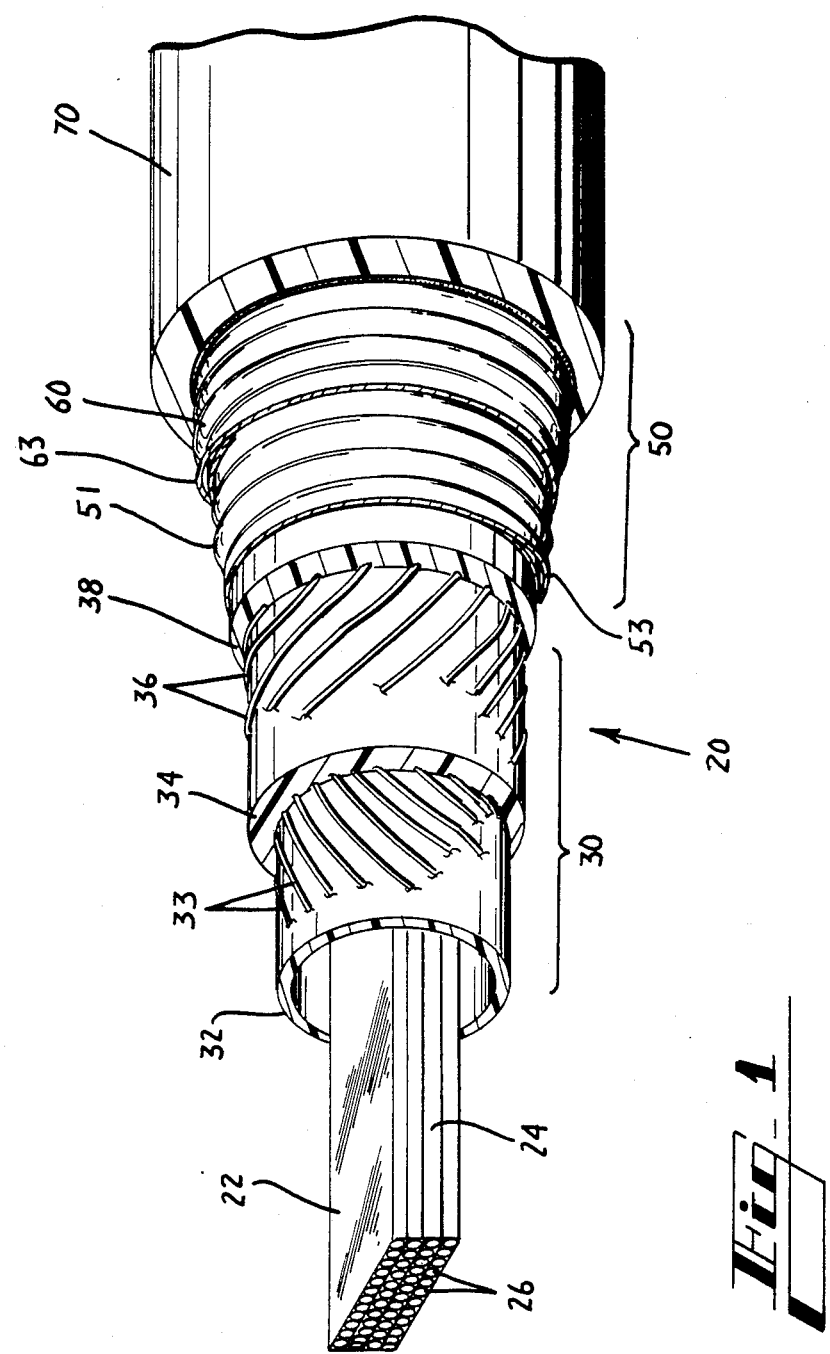
FIG. 1 is a perspective view of a corrosion and rodent-resistant bonded sheath cable of this invention.
Figure 2:
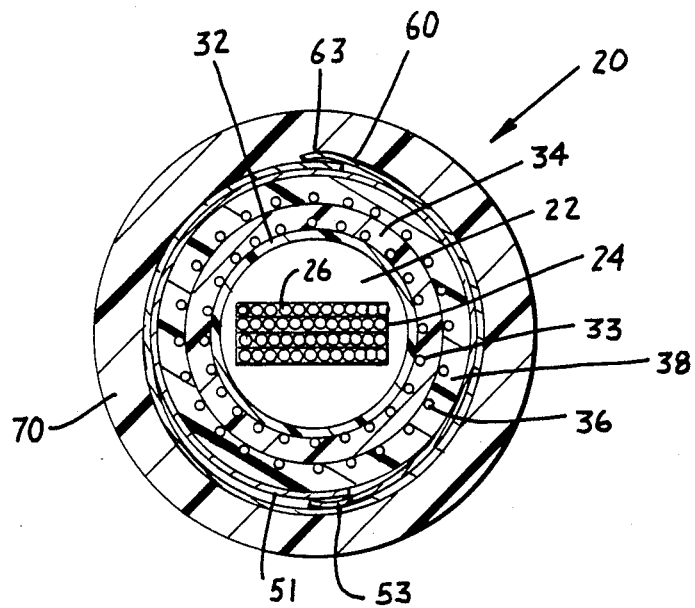
FIGS. 2-3 are end views in section of cables which include a sheath system of this invention.

Referring now to FIGS. 1 and 2, there is shown a cable which is designated generally by the numeral 20. The cable 20 includes a core 22 which includes a plurality of lightguide fiber ribbons 24—24. Although not shown in the drawings, the core 22 generally is undulated. Each of the ribbons 24—24 includes an array of coated lightguide fiber 26—26. Although the cable 20 described herein is a lightguide fiber cable, it should be understood that it could be a cable in which the conductors are insulated copper conductors, for example. Also, it should be understood that the cable 20 generally will have an outer diameter of one inch or less. Although the invention is not limited to such a size cable, aerial and buried lightguide cables at the present time do not generally exceed that size.

Surrounding the core 22 is an inner sheath system which is designated generally by the numeral 30 and which includes a heat barrier layer 32 which is made of an insulative material such as polyvinyl chloride (PVC). The layer 32 forms a tube which is loosely disposed about the core 22. A plurality of strength members 33—33 are wrapped helically about the layer 32. These strength members may be made of high strength steel. Over the strength members 33—33 is extruded an inner jacket 34 which is made of a plastic material such as polyethylene. Over the jacket 34 are wrapped another plurality of strength members 36—36. A jacket 38 is extruded over the second plurality of strength members 36—36 to complete the inner sheath system. The construction of the cable thus far is described in U.S. Pat. No. 4,241,979 which issued on Dec. 30, 1980 in the names of P. F. Gagen and M. R. Santana, and which is incorporated by reference hereinto.

Figure 3:
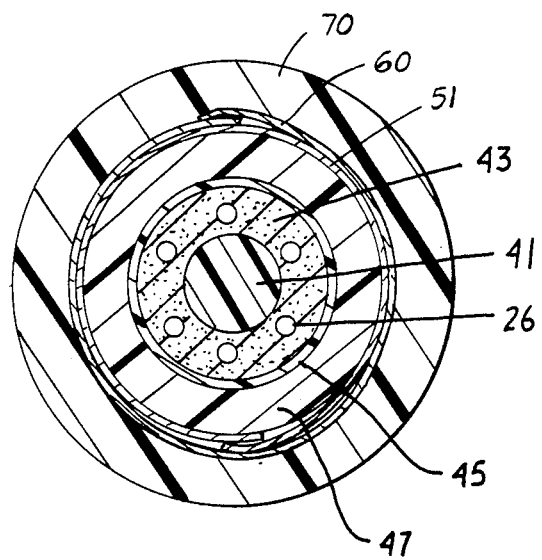

In FIG. 3 there is shown a lightguide cable having a different core arrangement. There, a strength member 41 is disposed along the longitudinal axis of the cable. It may be a steel wire, or a composite plastic material, for example. About the center strength member are stranded a plurality of lightguide fibers 26—26 which are enclosed in a waterproofing composition 43. A protective unit tube 45 comprising a thermoplastic rubber, for example, is formed about the filling material. Then an inner jacket 47 comprising a polyethylene plastic material is extruded about the tube 45.

Other core arrangements also may be enclosed in the inner sheath system 30. Those in FIGS. 1-3 are exemplary only. What is important is that the core is provided with substantial protection from rodent attack and lightning strikes, as well as from abrasion and crushing, by a sheath system 50 of this invention.

Returning now to FIGS. 1 and 2, it can be seen that the sheath system 50 of this invention includes an inner shield 51. The inner shield 51 comprises a metallic material, preferably copper, which encloses the core. It is formed from a strip of material which is corrugated, to provide flexiblity, and has a longitudinal overlapped seam 53. In the preferred embodiment, the inner shield has a thickness of about 0.006 inch.

Although the inner shield 51 of the preferred embodiment is made of copper, it may be made of aluminum. The material of the inner shield is characterized by a relatively high thermal capacity and a relatively low electrical resistivity. A measure of the thermal capacity of the material from which the shield is formed is a parameter designated U/V, which is energy per unit volume required to raise the temperature of a material from ambient to that of a molten state. For copper, this parameter is about 80 to 90 BTU/in$^3$. An inner shield which is made of copper and which has a thickness of 0.006 inch has a thermal capacity which is about twice that of one made of aluminum and having a thickness of 0.008 inch. Resistivity is a measure of the ability to conduct current efficiently. The smaller the value, the better the electrical conductivity, which is the reciprocal of resistivity. The resistivity of copper is about 0.156 ohm grams/m$^2$, whereas for aluminum it is about 0.234.

The capability of the cable to resist lightning damage is a function of thermal capacity and electrical resistivity. Lightning damage may occur because of electrical energy induced in the shield by lightning strikes. It is important that the electrical energy accompanying the strike be dissipated as quickly as possible; otherwise, arcing may occur from the shield to the strength wires and cause damate to the fibers. Heating damage to a cable at the lightning strike point results from the high temperature arc to the metal. Additional heating of the sheath occurs as the lightning current flows along the sheath system. This heating may be minimized by using a metallic oversheath having a high thermal capacity, thus allowing the lightning current to flow to ground without causing much burning. Also, the corrugations cause the shield to have more metal per inch of length which is helpful in withstanding lightning strikes.

Surrounding the inner shield 51 is an outer shield 60 (see again FIGS. 1 and 2). It is made from a laminate 61 of an adhesive system 62 and of a metallic material 64 (see FIG. 4) and is designed to become bonded to a subsequently applied jacket. The outer shield 60, which in a preferred embodiment has a thickness of 0.008 inch, is corrugated and has a longitudinal overlapped seam 63 that is displaced circumferentially from the seam 53 of the inner shield 51. In the preferred embodiment, the metallic material 64 has a thickness of 0.005 inch. Because of the corrugations, the laminate 61 has enhanced flexibility, additional metal per unit length and improved impact resistance and radial toughness.

The metallic layer 64 of the outer shield 60 is comprised of a material which is corrosion-resistant. One such material is a stainless steel referred to as alloy 304. Stainless steel may be characterized as being an iron-based alloy having at least a predetermined chromium content. The metallic material 64 of the outer shield 60 in a preferred embodiment of this invention should have a chromium content of at least 12% by weight.

Typically, commercially available stainless steel includes an outer layer 65 (see FIG. 4) which comprises chrom.um and iron oxides, and which is adhered to the base metal of the steel. The oxide layer on the surface of the steel offers protection from corrosion. It is relatively thin, perhaps in the range of 20 to 40 Angstroms and may be non-uniform.

Other desired properties are high elongation and suitable tensile strength. For example, low carbon steel has an elongation in the range of about 15% to 30%, a yield strength in the range of 24,000 to 54,000 psi and a tensile strength of about 43,000 to 66,000 psi. A general type stainless steel has an elongation in the range of 13% to 60%, a yield strength of 30,000 to 95,000 psi, and tensile strength of 70,000 to 125,000 psi. It has been determined that for the outer stainless steel shield to provide effective resistance against corrosion and against rodents, it should have an elongation in excess of 30% and a tensile strength in excess of 70,000 psi. The stainless steel which is used for the preferred embodiment of the cable 20 of this invention has an elongation of 55%, a yield strength of 35,000 psi, and a tensile strength of 85,000 psi.

If a corrosion-resistant metallic tape which is wrapped longitudinally about a core to form a shield is bonded to a subsequently applied plastic jacket, the longitudinally seamed shield is better able to withstand rodent attack, even on cables in the critical size range. Adhesive bonding between the jacket and a carbon steel shield has been of considerable help with respect to buckling resistance in copper core cables. Further, because it adds considerable mechanical support to the tube geometry of the steel, bonding improves crush resistance and tends to hold the overlapped seam closed, thereby overcoming a major concern with respect to rodent resistance. Finally, bonding prevents the wholesale removal of the plastic jacket in strips or sheets by rodents, necessitating the removal laboriously of each elemental area. This greatly increases the work necessary to violate the sheath and thus impedes the progress of rodents.

A plastic jacket is bonded to the outer shield 60 through an adhesive system which is bonded to the metallic layer 64. The bond is helped also by using a stainless steel in which the metallic material 64 has a relatively coarse, as opposed to a polished outer surface. This surface topography optimizes mechanical interlocking and provides more surface area for bonding between chemically similar functions of the oxide layer 65 and constituents of the adhesive system. The outer surface of the stainless steel of the shield 60 is provided with an enhanced oxide layer which is cohesive and which has at least a minimum thickness that tends to be substantially uniform. A polymer adhesive material is bonded to the oxide layer 65 with a peel strength which is sufficient to permit corrugating of the outer shield.

In a preferred embodiment, the adhesive system 62 includes a dual film layer which comprises a first adhesive material 66 and a second adhesive material 68. The first adhesive material is one which bonds suitably to the oxide layer 65 of the metallic material 64 of the outer shield 60. A minimum peel strength between the two is predetermined to allow a supply tape of the laminate 61 to be corrugated and formed into the outer shield 60 without delamination occuring. Also, the second adhesive material 68 is chosen to be compatible with a subsequently extruded plastic jacket. In the preferred embodiment, the first adhesive material 66 is a terpolymer which comprises an ethylenically unsaturated carboxylic acid, an ester of an ethylenically unsaturated carboxylic acid and ethylene and which has a thickness of about 0.001 inch. Specifically, the terpolymer comprises about 85–90% by weight of ethylene, about 3–5% by weight of an acrylic acid and an acrylic acid ester. Together, the acrylic acid and the acrylic acid ester comprise about 10–15% by weight of the terpolymer composition. See U.S. Pat. No. 4,122,248 which is incorporated by reference hereinto. The second adhesive material 68 is referred to as a carrier and in a preferred embodiment comprises a linear low density polyethylene plastic material and has a thickness of 0.002 inch. Linear low density polyethylene plastic material has a density in the range of 0.910–0.940 gm/cm$^3$ and includes a significant number of short chain branches.

It should be noted that the materials of the dual adhesive film are chosen such that the melting point of the second adhesive material is substantially above that of the first. For example, the melting point of the carrier is about 315° F. whereas that for the first adhesive material is about 260° F. This becomes important during the laminating of the dual adhesive film to the corrosion-resistant metallic material.

For an outer covering, the cable 20 is provided with a jacket 70 which is made of a plastic material such as a linear low density polyethylene material having a density in the range of 0.910–0.940 gm/cm$^3$, low density polyethylene, or medium density polyethylene. This is advantageous inasmuch as these polyethylenes permit the use of a lower extrusion temperature and because they exhibit better properties at low temperatures in the field. The jacket 70 which is caused to become bonded to the outer shield 60 by the carrier 68 of the dual adhesive film has a thickness in the range of about 0.050 to 0.060 inch for the lightguide cable 20 described herein.

The sheath system of this invention includes a high strength, uniform structural bond. As a result, the outer shield 60 and the jacket 70 act as a composite mechanical unit without delamination when the cable is flexed under a wide range of conditions. This is in contrast to some prior art bonded sheath systems in which the shield is bonded to the jacket only to prevent corrosion and to prevent moisture ingress into the cable. Also established is a relatively long life bond for a cable buried in a wet or damp soil. Prior art bonds, while of sufficient initial strength, generally fail in the presence of high humidity or wet soil as encountered in aerial or buried installations.

The bonded jacket 70 provides the cable with mechanical robustness. It prevents a rodent which has bitten into the jacket 70 from pulling a large portion of the jacket from the underlying shield. As a result, rodents are required to chew each portion of the jacket to remove it instead of being able to remove large portions by a combination of chewing and pulling. Any plastic material not removed serves to support and reinforce the metallic shield 64 through the composite-like behavior of the bonded metal/plastic structure. This provides considerable support and protection to the seam 63, making its separation difficult and therefore extremely rodent-resistant. Because of its corrosion-resistance, the outer shield metallic material 64 will not corrode, notwithstanding its exposure through holes made by rodents in the jacket. Also, the high tear resistance of stainless steel relative to that of carbon steel prevents a rodent from entering the system even if the rodent has been able to insert teeth between the overlapping edge portions.

The sheath system 50 of this invention also provides enhanced lightning protection. Electrical and thermal energy associated with a direct lightning strike are dissipated readily from the strike location by the inner shield 51. Also, moisture in the soil vaporizes instantaneously from the heat of the lightning arc causing the so-called steamhammer effect. The cable is impacted and may be crimped. Protection from this effect is particularly important to the integrity of a lightguide fiber cable. On the other hand, cables in which the core is made of copper are more flexible and hence more capable of resisting impact than lightguide cables that comprise brittle glass fibers. Advantageously, the outer composite structure comprising the laminate of the stainless steel bonded firmly to the jacket 70 protects the lightguide cable core 22 sufficiently so that it is not damaged because of its relatively low flexibility. The stainless steel layer 64 which has higher strength properties than carbon steel is able to absorb substantial mechanical energy which increases its capability to prevent damage during a direct lightning strike.

Although it has been general practice to use an aluminum shield for dissipating lightning currents, copper of somewhat thinner cross-section is used for the preferred embodiment of this invention. Notwithstanding a longitudinal resistivity which is about equal to that of a somewhat thicker aluminum shield, it has substantially greater resistance to lightning damage. This is due to the material properties of copper such as, for example, its higher melting point, latent heat of fusion and strength properties at high temperatures relative to those for aluminum.

Inasmuch as it increases the resistivity of the sheath, stainless steel generally has been restricted to buried service wire installations rather than buried rural distribution wire. Buried service wire is usually protected from direct lightning strikes by nearby buildings that shunt high current away from the shield. On the other hand, rural distribution wires generally have no such protection. The low overall resistance of the dual shielding of the sheath system 50 minimizes heating damage to the core 22 and voltage breakdown of the insulation between conductors and the shield. Also, the copper inner shield 51 together with the improved corrosion-resistance of the outer shield provides better long term lightning protection.

In a method of making the cable 20 of this invention, the laminate 61 is assembled first on a line 80. As can be seen in FIG. 5, a strip 81 of stainless steel from a supply 82 is advanced at a line speed of about 100 feet per minute past rollers 83—83, a welding fixture 84 and a metal guide 86. In order to improve the adhesion between the stainless steel and the adhesive system 62 which is destined to bond the stainless steel to the jacket 70, the stainless steel strip should be non-polished. The rougher the surface, the more surface area is provided for contact with the first adhesive material 66.

Then the stainless steel strip 81 is moved through a preheating device 87 such as a quartz heater or past an induction heated roller, for example, which exposes the strip to a temperature in the range of 400° to 550° F. The heating in this temperature range provides an enhanced oxide outer layer 65 which is helpful in promoting suitable adhesion between the stainless steel and the first adhesive material 66. The first adhesive material 66 is to become bonded to the oxide layer 65 and not to the base metal. The oxide layer 65 comprises those oxides which provide active sites for bonding, such as, for example, chromium oxides and has a thickness lying in an optimum range. If within this range of thickness, there is less chance for the base metal, to which the adhesive does not bond well, to become exposed. It is believed that the preheating treatment causes the oxide layer to have at least an acceptable minimum average thickness in this range and to render it more attractive to polar functions in the adhesive system 62. The thickness tends to become substantially uniform. Should the temperature exceed this range, additional iron oxides may form and impair the bonding or the oxide layer may become so thick and fragile as to impair its cohesive strength. Also, the preheat temperature exceeds the melting points of the first and second adhesive materials.

From the heating device 87, the steel strip 81 is moved past preheat rollers 88 and 89 and into the nip between a set of pinch rollers 91—91. At its entry between the rollers 91—91, the steel strip 81 has a temperature of about 250° F. At the pinch rollers 91—91, the steel strip 81 is brought into substantial engagement with a strip 92 of a dual adhesive film provided by a supply 93 (see FIGS. 5 and 6). The dual adhesive film comprises the hereinbefore-mentioned terpolymer adhesive 66 and polyethylene carrier 68. As can be seen in FIG. 5, the strip 92 is advanced from the supply 93 through a tension device 94, past rollers 96–96, through a film guide 97 and into juxtaposition with the steel strip 81 between the rollers 91—91.

It should be noted that the orientation of the strip 92 is important. As can be observed from FIG. 6, the strip 92 is oriented so that the carrier 68 portion engages the roller 91 and the first adhesive material 66 faces and becomes adhered to the steel strip 81. Advantageously, the melting point of the carrier 68 and the temperature of the rollers 91—91 are such that it does not adhere to the rollers. This allows the lamination of a coextruded film to the steel strip 81 without contaminating the apparatus.

The rollers 91—91 are at an elevated temperature to heat the composite adhesive strip 92 and the steel strip to a temperature in the range of 200°-220° F. which is below the melting point of the first adhesive layer 66. Also, the pinch rollers 91—91, each having a diameter of about six inches, are supported to apply forces to the two strips to cause a pressure of about 100 psi, for example. The pressure which is adjusted depending on the diameter of the rollers causes the first adhesive to be attached lightly to the steel strip 81.

From the rollers 91—91, the superimposed strips 81 and 92 are advanced between a second set of pinch rollers 97—97 which further heat the strips and which apply a predetermined pressure thereto. The rollers 97—97 are effective to heat the two strips to a temperature of about 290° F. and to cause a pressure of about 100 psi to be applied thereto. The temperature is less than the melting point of the carrier 68. As the steel strip and dual adhesive film leave the rollers 97—97, they are bonded to each other to form the laminate 61 which is used to form the outer cable shield 60. The laminate 61 is moved past a guide 98 and onto a takeup 99.

In order to provide the bonded jacket, a dual adhesive is used. The carrier 68 has a melting point which is about 50° higher than that of the adhesive layer 66. During the passage through the first set of rollers 91—91, the adhesive strip 92 is prestuck to the stainless steel strip 81. If this is not done, air bubbles between the strip 92 and the steel strip 81 would insulate the adhesive strip from the steel and require additional heat to form the laminate. This could melt the carrier 68 unless it were made of a high density polyethylene plastic material which may limit the choice of plastic materials for the jacket 70 which is to be bonded thereto. However, by using the presticking step, the second set of rollers 97—97 laminates the two strips at a lower temperature and the steel strip 81 acts as a heat sink to dissipate heat and prevent the melting of the carrier 68. As a result, it is possible to use a linear low density polyethylene for the carrier 68 and the jacket 70 and still obtain a suitable bond with the stainless steel strip. Otherwise, the carrier 68 must be a higher melt temperature plastic material which may require the jacket 70 to be a high density polyethylene material. This would add about 50° to the melt point, create a problem during the jacket extrusion and probably result in low temperature jacket failures in the field.

Figure 7:
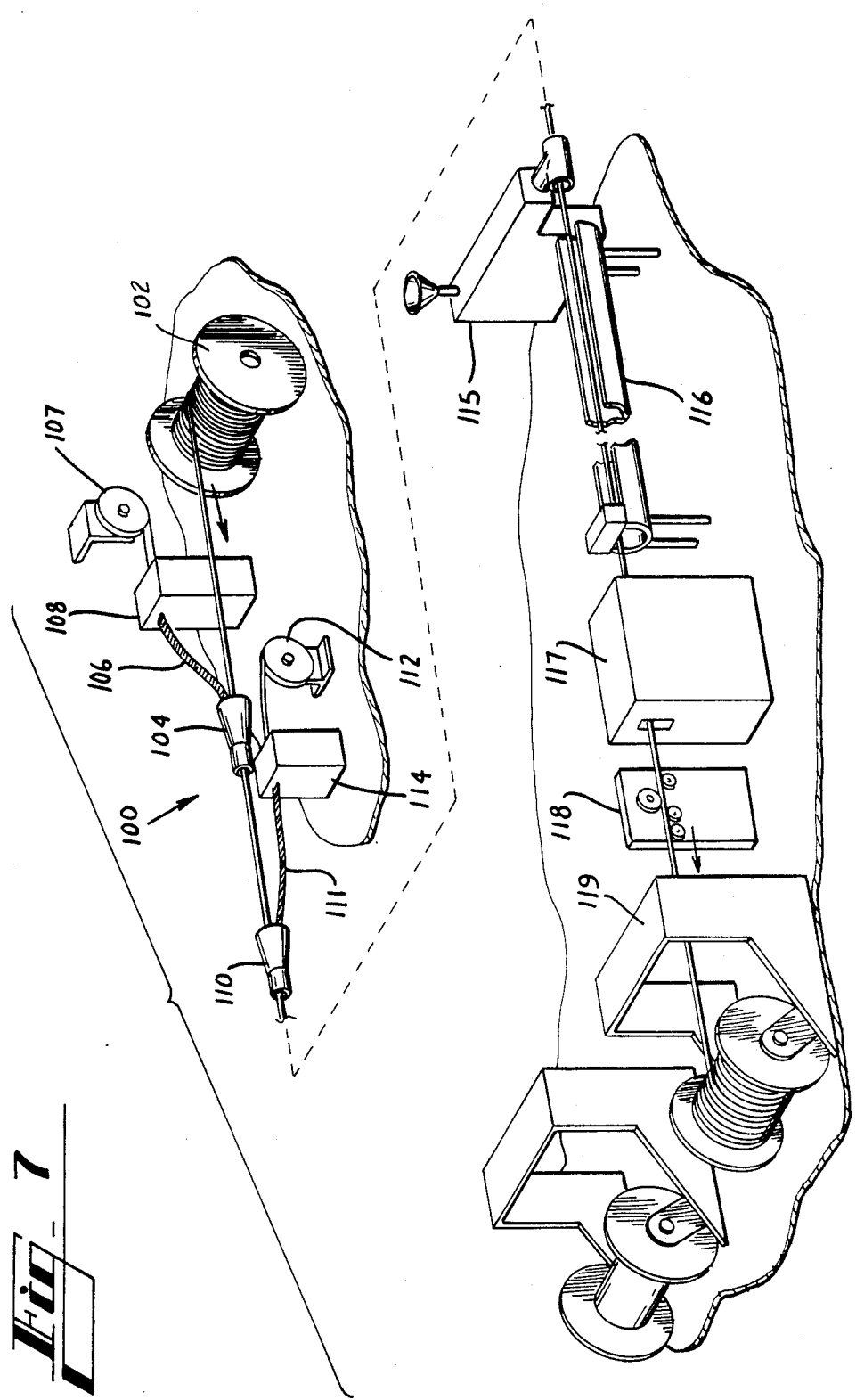
FIG. 7 is a schematic view of a manufacturing line for making a corrosion and rodent-resistant bonded sheath cable of this invention.

Going now to FIG. 7, there is shown a manufacturing line 100 for applying the shields 51 and 60 to the inner sheath system 30. The core 22 having the inner sheath system 30 thereabout is moved from a supply 102 through a forming device 104 into which a corrugated tape 106 is advanced. The tape 106 is provided by a supply 107 and is fed through a corrugator 108. At the forming device 104, which may be that disclosed and claimed in U.S. Pat. No. 4,308,662 which issued Jan. 5, 1982 to W. D. Bohannon, Jr., the copper tape 106 is wrapped about the covered core to form the longitudinal overlapped seam 53. From there, the shielded core 22 is advanced through a second forming device 110 into which a tape 111 comprising the stainless steel adhesive laminate 61 formed on the apparatus 80 is fed. The stainless steel tape 111 is advanced from a supply 112 into a corrugator 114. The second forming device 110 causes the laminate 61 to be wrapped about the copper shield 51 with an overlapped seam 63 which is displaced preferably about 180° from that of the copper shield. Also, as can be seen in FIG. 2, the outer longitudinal edge portion of the shield 60 is directed inwardly toward the core and is supported by the underlying edge portion.

Then, the double shielded core is advanced through an extruder 115 which applies the jacket 70. The heat of extrusion causes the jacket 70 to become bonded to the carrier of the laminated outer shield 60. As a result, the outer shield 60 is bonded to the plastic jacket 70. The jacketed cable 20 is moved through a cooling trough 116 by a capstan 117. A printer 118 marks the jacket 70 and the cable 20 is moved onto a takeup 119.

Testing

A test which simulates an encounter of a buried cable with rodents presents a cable sample on one side of a cage divider which is provided with a hole. Ten specimens of each of three sample lightguide fiber cables, all 0.73 inch in overall diameter, were subjected to a seven day exposure to gophers and to squirrels. In one sample, the inner and outer shields 51 and 60 were applied without bonding the jacket; in the others, the jacket was bonded to the outer shield. In all cases, the specimens were oriented to optimize the animals' access to the overlapped seam 63. Results showed that in all cases, the outer plastic jacket was removed, but that no animals succeeded in penetrating the steel shield or in gaining entry to the core by lifting the overlapped seam 63. In sixty individual test exposures, there were no failures. However, the degree to which the seam was disturbed increased in the absence of jacket bonding.

In order to prepare cable samples for lightning testing, one end of each was stripped for a few inches to expose the metallic members of the sheath and oversheath which were then secured to a metal end plate. For testing, the samples were buried in a box, filled with wet sand with the metal end plate of each sample resting on a ground plate in the box. A small hole was drilled in the jacket 70 of each to insure that the discharge current from an electrode flowed directly to the metallic sheath rather than along the outside of the jacket to the ground plate. Sixteen cable samples were tested at various peak current levels. Nine of the samples included a corrugated 0.008 inch aluminum inner shield, and seven, a corrugated 0.006 inch copper inner shield. The inner shield of each sample was covered by the stainless steel.

The aluminum-shielded cables were subjected to spark discharge current peaks ranging from 33 kiloamperes (hereinafter ka) to 100 ka. Arcing sometimes occurred in the outer layer strength wires 36—36 (see FIG. 1) at the higher current levels. There was some arcing to the inner layer wires 33—33 for samples tested at peak currents greater than 60 ka. None of the fibers 26—26 were damaged in any of these samples.

Samples containing a corrugated copper shield under the stainless steel were tested at peak current levels of 60 ka to 195 ka. Arcing of the strength wires occurred only at very high peak currents. It appeared that the degree of physical damage in copper-shielded sample cables tested at 60 ka was similar to that in the aluminum shielded cables tested at 33 ka. Again, none of the lightguide fibers in any of the samples were damaged.

The laminated stainless steel for the lightguide cable 20 of this invention was subjected to several tests for peel strength. First, there was a test in which a leading portion of the adhesive system was retroflexed and peeled from the underlying stainless steel layer. To pass this test, each inch of width of the adhesive system 62 must require at least three pounds to remove it from the steel layer 64. Secondly, a stainless steel strip was covered with the dual adhesive film and a layer of polyethylene which simulated the jacket 70. The jacket 70 and film were peeled from the underlying metal and the pounds of force required to do so recorded. An acceptable result is 14 pounds per inch of width of film. Thirdly, a longitudinal strip of the jacket 70 and dual adhesive film were peeled from a stainless steel outer shield 60 which enclosed an inner shield of a lightguide cable 20. In this instance, the shield was corrugated and an acceptable test result is at least 6 pounds per inch of width. Each of the sample cables passed all three tests.

It is to be understood that the above-described arrangements are simply illustrative of the invention. Other arrangements may be devised by those skilled in the art which will embody the principles of the invention and fall within the spirit and scope thereof.

What is claimed is:

1. A cable, which is rodent and lightning resistant, said cable comprising:
   a core comprising at least one conductor;
   a metallic inner shield which encloses said core, and which has a relatively high thermal capacity and a relatively low resistivity;
   a corrugated outer shield which encloses said inner shield and which has a longitudinal overlapped seam, said outer shield being formed from a laminate which comprises:
     a first adhesive material;
     a corrosion-resistant metallic material which has at least a predetermined chromium content and a relatively high elongation, a base layer and an oxide surface layer to which is bonded said first adhesive material, and a relatively coarse outer surface, said oxide layer having sufficient cohesion and sufficient adhesion to said base layer and to said first adhesive material to prevent delamination when said laminate is corrugated and formed about said inner shield; and
     a second adhesive material which is bonded to said first adhesive material; and
   a jacket which is made of a plastic material and which is bonded to said second adhesive material to form a composite with said corrosion-resistant metallic material which has sufficient thickness, elongation and tensile strength to cause said composite to inhibit degradation of said cable by rodents and to provide said cable with enhanced lightning impact resistance.

2. The cable of claim 1, wherein the chromium content of said metallic layer of said outer shield is at least 12% by weight.

3. The cable of claim 2, wherein said outer shield comprises an iron-based alloy which includes chromium in the range of about 12 to 30% by weight.

4. The cable of claim 2, wherein said corrosion-resistant metallic material has an elongation of about 55% and a tensile strength of about 85,000 psi.

5. The cable of claim 1, wherein said oxide surface layer is relatively thin and has a substantially uniform thickness.

6. The cable of claim 5, wherein said metallic material of said outer shield has a thickness which is greater than one-half the thickness of said inner shield.

7. The cable of claim 6, wherein said inner shield and said metallic material of said outer shield have about the same thickness.

8. The cable of claim 6, wherein the thickness of said corrosion-resistant metallic material of said outer shield has a thickness of 0.005 inch.

9. The cable of claim 1, wherein said metallic inner shield is made of copper.

10. The cable of claim 1, wherein said first adhesive material is a terpolymer comprising ethylene, an ethylenically unsaturated carboxylic acid and an ester of an ethylenically unsaturated carboxylic acid and said second adhesive material is compatible with the plastic material of said jacket.

11. The cable of claim 10, wherein said first adhesive material is a terpolymer comprising about 85–90% by weight of ethylene, about 3–5% by weight of an acrylic acid, and an acrylic acid ester, and wherein said acrylic acid and said acrylic acid ester together comprise about 10–15% by weight of said terpolymer.

12. The cable of claim 10, wherein said second adhesive material is a linear low density polyethylene plastic material.

13. The cable of claim 12, wherein said jacket is made of a linear low density polyethylene plastic material.

14. The cable of claim 13, wherein the density of the jacket material is in the range of about 0.910–0.940 gm/cm$^3$.

15. The cable of claim 1, wherein the adhesion of said oxide layer to said first adhesive material has a peel strength which is at least about 3 pounds per inch of width of said corrosion-resistant metallic material.

16. The cable of claim 1, wherein said inner shield has a longitudinal seam and said overlapped seam of said outer shield is diametrically opposed to said seam of said inner shield.

17. A lightguide fiber cable, which is rodent and lightning resistant, said cable conprising:
   a core which includes at least one lightguide fiber;
   an inner sheath system which includes:
     a tubular cover which encloses said core;

a plurality of strength members which are wrapped helically about said tubular cover; and a jacket which covers said plurality of said strength members and which is made of a plastic material; and an outer sheath system which encloses said inner sheath system and which comprises:

a metallic inner shield which encloses said inner sheath system, which has a longitudinal seam and which has a relatively high thermal capacity and a relatively low resistivity;

a corrugated outer shield which encloses said inner shield and which has a longitudinal seam, said outer shield being a laminate which comprises:

a first adhesive material;

a corrosion-resistant metallic material which has at least a predetermined chromium content and a relatively high elongation, a base layer and an oxide surface layer to which is bonded said first adhesive material, and a relatively coarse outer surface, said oxide layer having sufficient cohesion and sufficient adhesion to said base layer and to said first adhesive material to prevent delamination when said laminate is corrugated and formed about said inner shield; and a second adhesive material which is bonded to said first adhesive material; and a jacket which is made of a plastic material and which is bonded to said second adhesive material to form a composite with said corrosion-resistant metallic material which has sufficient thickness, elongation and tensile strength to cause said composite to inhibit degradation of said cable by rodents and to provide said cable with enhanced lightning impact resistance.

18. The cable of claim 17, wherein said inner metallic shield is made of copper.

19. The cable of claim 17, wherein said corrosion-resistant metallic material is an iron-based alloy having a chromium content of at least 12 percent by weight.

20. The cable of claim 19, wherein said outer shield includes a metal having an elongation of about 55% and a tensile strength of about 85,000 psi.

21. The cable of claim 19, wherein said metallic material of said outer shield has a thickness which is greater than one-half the thickness of said inner shield.

22. The cable of claim 19, wherein said first adhesive material is a terpolymer comprising ethylene, an ethylenically unsaturated carboxylic acid and an ester of an ethylenically unsaturated carboxylic acid and said second adhesive material is a linear low density polyethylene plastic material.

23. The cable of claim 19, wherein the adhesion of said oxide layer to said first adhesive material has a predetermined peel strength which is at least about 3 pounds per inch of width of said outer shield.

24. The cable of claim 19, wherein said seam of said outer shield is diametrically opposed to said seam of said inner shield.

* * * * *